(No Model.)
H. J. GORMLEY.
TRICYCLE.
No. 314,236. Patented Mar. 24, 1885.
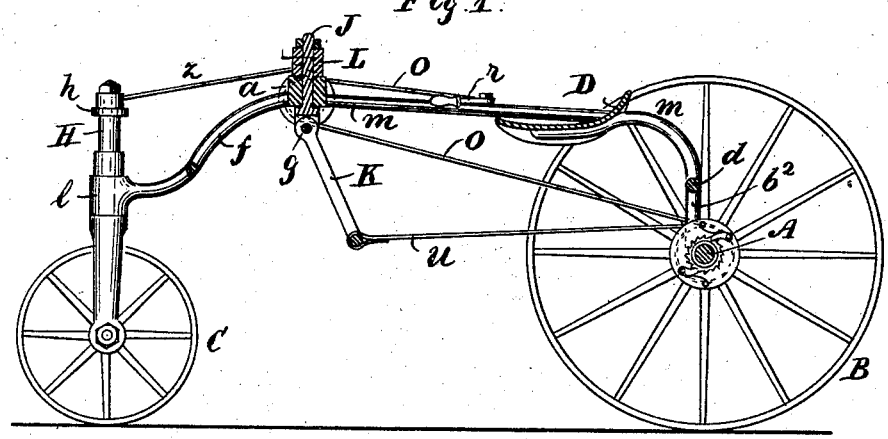
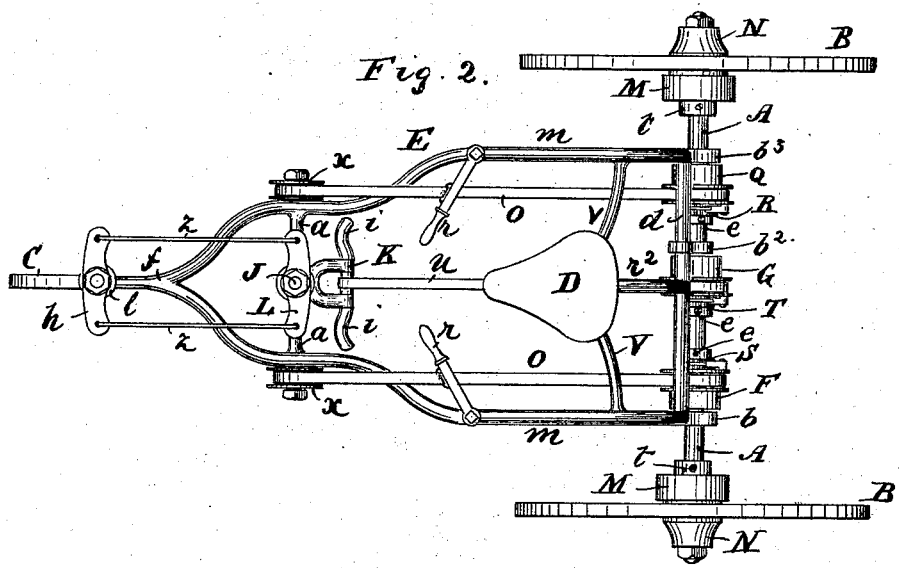
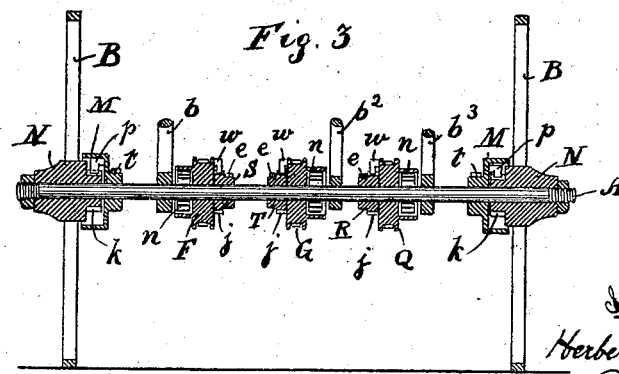
Witnesses.
E. Planta.
L. J. White
Inventor
Herbert J. Gormley,
C. A. Shaw.
Per Attorney.

UNITED STATES PATENT OFFICE.

HERBERT J. GORMLEY, OF BOSTON, MASSACHUSETTS.

TRICYCLE.

SPECIFICATION forming part of Letters Patent No. 314,236, dated March 24, 1885.

Application filed January 13, 1885. (No model.)

*To all whom it may concern:*

Be it known that I, HERBERT J. GORMLEY, of Boston, in the county of Suffolk, State of Massachusetts, have invented a certain new and useful Improvement in Tricycles, of which the following is a description sufficiently full, clear, and exact to enable any person skilled in the art or science to which said invention appertains to make and use the same, reference being had to the accompanying drawings, forming part of this specification, in which—

Figure 1 is a vertical longitudinal section of my improved tricycle; Fig. 2, a top plan view of the same, and Fig. 3 a vertical longitudinal section taken through the axle.

Like letters of reference indicate corresponding parts in the different figures of the drawings.

My invention relates to that class of tricycles which are designed to be actuated or driven by both hand and foot power; and it consists in a novel construction and arrangement of the parts, as hereinafter more fully set forth and claimed, by which a more desirable and effective device of this character is produced than is now in ordinary use.

The nature and operation of the improvement will be readily understood by all conversant with such matters from the following explanation.

In the drawings, A represents the main axle, B the main supporting or driving wheels, C the steering or pilot wheel, D the seat, and E the body. The body consists of the side pieces, $m$ $m$, and perches or cross-bars $d$ $a$, preferably formed and disposed as best seen in Fig. 2. The side pieces, $m$, converge, and are united at their forward ends to form the downwardly-curved neck $f$, which terminates in the head $l$. Projecting vertically from the bar or perch $d$ there are three arms or brackets, $b$ $b^2$ $b^3$, in the lower enlarged ends of which the axle A is journaled. An upwardly-projecting and inwardly-curved bracket, $r^2$, is centrally attached to the bar $d$, and on this and two corresponding brackets, $v$, attached to the side pieces, $m$, the seat D is disposed. A bifurcated shaft, H, is journaled vertically in the head $l$, said shaft carrying at its upper end the fixed cross-bar $h$ and in its lower or forked end the pilot-wheel C.

Journaled vertically at the enlarged center of the cross-bar $a$ there is a shaft, J, and jointed at $g$ to the lower end of said shaft there is a treadle-bar, K, provided with the foot-pieces $i$. A fixed cross-bar, L, is mounted on the shaft J, said bar being connected at either end with the bar $h$ by means of rods $z$. The hubs N of the wheels B are respectively provided at their inner ends with ratchet-teeth $k$, which engage spring-pawls $p$ in chambered collets M, secured to the axle A by screws $t$, the ratchet being so constructed and arranged as to permit the wheels to turn forward, but not backward.

Disposed on the axle A there are three collets, R T S, secured thereto by the screws $e$, and provided with backwardly-inclined teeth $j$. A clutch-collet, F, is disposed on the axle A adjoining the bracket $b$, said collet having its outer end chambered and provided with a flat coiled spring, $n$, the outer end of this spring being attached to the collet and its inner end to said bracket. The collet is also provided at its inner end with a spring-pawl, $w$, adapted to engage the teeth $j$ on the fixed collet S. Corresponding clutch-collets, G Q, are also disposed on said axle, the collet G having its spring $n$ connected with the bracket $b^2$, and being adapted to engage the fixed collet T, and the collet Q having its spring connected with the bracket $b^3$, and being adapted to engage the fixed collet R.

Journaled at either side of the body E, opposite the cross-bar $a$, there is a pulley, $x$, and pivoted at its outer end to either of the side pieces, $m$, there is an inwardly-projecting hand-lever, $r$. Each of the clutch-collets Q F is provided with a strap, O, which passes around the clutch and has its rear end secured thereto, the forward ends of the straps being respectively carried over the pulleys $x$ and brought back to the levers $r$, to which they are secured. The clutch-collet G is also provided with a strap, U, which has its rear end passed around and secured to said collet, its forward end being secured to the swinging treadle-bar K.

In the use of my improvement the rider or passenger, being mounted on the seat D, pulls on the levers $r$, and at the same time pushes with the feet against the foot-pieces $i$ of the treadle, thereby causing the straps U O to revolve the clutches and propel the vehicle in a manner which will be readily obvious without a more explicit description.

It will be obvious that when the levers r are pulled toward the seat D the tendency will be to draw the rider forward or off said seat, this tendency being resisted by bracing the feet against the treadle, thereby pulling on the strap U and utilizing the entire force exerted on the levers.

The vehicle is steered by the feet, the bar K being hinged to swing on the shaft J, but not to revolve independently of said shaft, so that the wheel C may be turned to the right or left by pressing with the right or left foot on the foot-pieces i, as the case may be, and thereby actuating the shaft H through the shaft J, cross-bars L h, and connecting-rods z. It will also be obvious that the vehicle may be run by either hand or foot power, or by both conjointly.

By journaling the wheels B loosely on the axle A and providing them with ratchets, as described, the necessity of using a brake to prevent the vehicle from running backward when it is stopped on a side-hill is obviated. The wheels being loosely journaled on the axle also enables the vehicle to be turned more readily and with greater ease than would be possible if they were rigidly attached thereto. I do not, however, confine myself to providing the wheels with ratchets, as they may be rigidly attached to the axle, if preferred.

It will be obvious that when the straps O U are pulled the pawls w will engage the ratchet-teeth on the fixed collets and rotate the axle A, and that when said straps are released the expansive action of the springs n will wind up said straps around their respective loose collets preparatory to pulling them again.

Having thus explained my invention, what I claim is—

1. In a tricycle, the combination of the following instrumentalities, to wit: a body, a seat, a pilot-wheel journaled at the forward end of said body, an axle journaled in the rear end of said body, supporting or driving wheels disposed on said axle and adapted to be turned forward therewith, three clutches disposed on said axle, two of said clutches being respectively provided with straps passing over pulleys and connected with pivoted hand-levers, a treadle mechanism adapted to be operated to steer the vehicle, and also to actuate a clutch on said axle, and a strap connecting the treadle with a clutch on said axle, substantially as described.

2. In a tricycle, a treadle mechanism adapted to be operated to control the pilot-wheel, and thereby steer the vehicle, and also to actuate a clutch on the main axle, and thereby assist in propelling the vehicle, substantially as described.

3. In a tricycle, the treadle-bar K, hinged to the shaft J, in combination with the pilot-wheel C, axle A, and means for operatively connecting said axle, wheel, and bar, substantially as set forth.

4. In a tricycle, the bar K, shaft J, bars h L, rods z, shaft H, wheel C, strap U, clutch-collets G T, axle A, and wheels B, combined and arranged to operate substantially as described.

5. The improved tricyle herein described, the same consisting of the body E, seat D, axle A, wheels B, provided with ratchet-teeth k, collets M, provided with pawls p, clutch-collets F S T G R Q, provided with springs n and pawls w, straps O U, levers r, pulleys x, bars K h L, shafts J H, rods z, and wheel C, constructed, combined, and arranged to operate substantially as set forth.

HERBERT J. GORMLEY.

Witnesses:
C. A. SHAW,
L. J. WHITE.